(12) United States Patent
Leng et al.

(10) Patent No.: US 6,365,852 B1
(45) Date of Patent: Apr. 2, 2002

(54) STEERING COLUMN SWITCH FOR MOTOR VEHICLES

(75) Inventors: Peter Leng, Russelsheim; Paul Junker, Bingen, both of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/525,069

(22) Filed: Mar. 14, 2000

(51) Int. Cl.[7] .................................................. H01H 9/00
(52) U.S. Cl. .................................. 200/61.54; 200/61.27
(58) Field of Search ........................ 200/4, 61.27, 61.3, 200/61.31, 61.32, 61.35, 61.36, 61.54, 332, 335

(56) References Cited

U.S. PATENT DOCUMENTS

| | | | | |
|---|---|---|---|---|
| 5,003,132 A | * | 3/1991 | Lagier | 200/4 |
| 5,491,312 A | * | 2/1996 | Newman et al. | 200/61.54 |
| 5,665,948 A | * | 9/1997 | Oikawa | 200/61.54 |
| 5,701,660 A | * | 12/1997 | Javery et al. | 29/622 |
| 5,710,400 A | * | 1/1998 | Lorenz et al. | 200/61.54 |
| 5,804,782 A | * | 9/1998 | Newman et al. | 200/61.27 |
| 5,847,344 A | * | 12/1998 | Denyer et al. | 200/61.88 |
| 5,861,593 A | * | 1/1999 | Wiersing et al. | 200/61.54 |
| 5,923,006 A | * | 7/1999 | Nakamura | 200/5 B |

* cited by examiner

*Primary Examiner*—Michael Friedhofer
(74) *Attorney, Agent, or Firm*—Thomas N. Twomey

(57) ABSTRACT

A steering column switch for motor vehicles comprises at least one wiper/washer switch (6 and 31), which is an integral part of a switch lever (1), whereby the contact bridge (16 and 37) of the wiper/washer switch is held in position on a rotary switch member (11 and 32) and acts with several contact arms (18) on switch contact paths (21 and 43) with associate connection contacts (23 and 41). The contact bridge (16 and 37) and the switch contact paths (21 and 41) interact to transfer switch function data in Gray code. This type of coding permits a reduced number of connection lines (25) and connection contacts (23 and 41), compared with the number of switch positions and, at the same time, permits relatively high switching reliability.

10 Claims, 4 Drawing Sheets

STEERING COLUMN SWITCH FOR MOTOR VEHICLES

CROSS-REFERENCE TO RELATED APPLICATIONS

This application claims priority, under 35 U.S.C. 119, of earlier-filed German Application 19912087.0, filed Mar. 18, 1999.

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention herein relates to a motor vehicle steering column switch comprising at least one wiper/washer switch being an integral part of a switch lever, where the switch has—located on a rotary switch member—a contact bridge with several contact arms acting on switch contact paths with associated connection contacts.

Known steering column switches of this type have at least one switch for the front or windshield wiping functions, which, in most cases, is located in a rotation-symmetrical manner on a longitudinal axis of a switch lever of the steering column switch and which can lock in different switch positions. A pushbutton switch for a front washing function is in a typical arrangement located on the free end of the switch lever. Frequently, the switch for the front wiping, functions located on the switch lever is associated with another switch for the rear wiping/washing functions. The switch for the front wiping functions, as well as the switch for the rear wiping/washing functions, comprises a number of contact bridges which correspond to the number of switch positions and act on respectively corresponding switch contact paths. These contact bridges, as well as their associated switch contact paths, extend in the form of a segment of a circle relative to the periphery of the rotary switch member of the respective switch on one end of the rotary switch member. Inasmuch as the contact bridges require a relatively large space, the number of switch positions of each switch is limited. In order to enable the front washing function the corresponding pushbutton switch is pressed, whereby the switch acts—via an actuation push-rod associated with a contact bridge—on the respective switch contact paths. The connection of the switch contact paths with the on-board electrical system of the motor vehicle is created by connection lines that are affixed to connection contacts and passed through the longitudinal axis of the steering column switch. The number of connection lines corresponds to at least the number of switch contact paths. The total number of switch positions and hence switch signals, in the switch for the front wiping functions, is greatly restricted due to the space requirements of the respective switch contact paths and their connection lines.

Furthermore, a Gray code has been known as being a particular expression of the binary code. Its basis is that two adjacent Gray numbers do not differ by more than one bit. Inasmuch as the difference between adjacent numbers can only be one digit, it can be recognized reliably during data transfer.

BRIEF SUMMARY OF THE INVENTION

The problem to be solved by the present invention is to provide a steering column switch of the above-described type, which has a wiper/washer switch with a large number of switch positions requiring only a small amount of space, offers high switching reliability and which has a reduced number of connection contacts relative to the switch positions.

In accordance with the present invention this problem has been solved in that the contact bridge and the switch contact paths act together for the transfer of switch function data in Gray code.

This interaction in Gray code, i.e., binary code, results in a reduced number of switch contact paths, as well as contact arms for the contact bridge, compared with the number of switch positions of the wiper/washer switch, thereby resulting in reduced space requirements within the wiper/washer switch and thus in a more compact design of the switch lever while, providing a multitude of switch positions. The reduced number of switch path contacts also means a reduced number of connection contacts and thus a reduced number of connection lines for the connection of these switch contact paths with the on-board electrical system of the motor vehicle. The type of coding, i.e., that two adjacent Gray-coded switch positions do not differ by more than one bit, which can be determined easily, ensures highly reliable switching operations. Therefore, when one switching function is performed, the subsequent one can be identified clearly.

In accordance with an advantageous modification of the invention, a front wiper/washer switch and a rear wiper/washer switch are provided. In this case the different switch functions are associated with the steering wheel switch in a spatially separated manner and can be assembled as needed.

In order to be able to manufacture the contact bridges of both switches at the lowest possible cost the contact bridges of the front and the rear wiper/washer switches are respectively configured as a stamped grid with resilient contact arms. Preferably, the contact arm associated with the front washing function of the contact bridge of the front wiper/washer switch points in a direction opposite the contact arms for the front wiping functions. This permits a reliable actuation of the contact arm associated with the front washing function.

Advantageously, the respective switch contact paths of the front and the rear wiper/washer switches are configured as a stamped grids. Therefore, a reliable contact of the contact bridge respectively associated with one stamped grid can be effected by means of a cost-effective manufacturing process.

In order to achieve a highly efficient assembly during the wiring operation of the steering column switch, the switch contact paths for contact with connection lines are advantageously provided with clamp-and-notch type connections.

Furthermore, the switch contact paths of the front wiper/washer switch are set in a non-rotational spacer ring located between the two rotary handles of the front and the rear wiper/washer switches. Inasmuch as the spacer ring typically consists of plastic material, the switch contact paths are set in by extrusion-coating with the use of an extrusion process.

In accordance with another embodiment of the present invention, a concentric shaft holding the front and rear wiper/washer switches is molded to the spacer ring, and the shaft is held in position by means of the rotary handle of the front wiper/washer switch on one side and in a base of the switch lever on the other side. The two wiper/washer switches are centered relative to each other and additional assembly components are therefore unnecessary.

Preferably, the switch contact paths of the rear wiper/washer switch are mounted to a support located between the base of the switch lever and the rotary handle of the rear wiper/washer switch. This gives the switch contact paths sufficient strength, thereby making them resistant to inadvertent damage. Preferably, this support is located in a non-rotational manner on the spacer ring shaft.

In accordance with another advantageous modification of the present invention, the contact arm of the contact bridge of the rotary switch member of the front wiper/washer switch can be actuated by means of a pushbutton set into the end of the switch lever, thereby actuating a pushrod for the front washing function. Therefore, a separate contact bridge for enabling this switch function is not necessary.

For reliable and secure switch positioning, the rotary switch member of the front wiper/washer switch comprises an end stop which interacts with a spring-biased stop sleeve associated with the spacer ring. Furthermore, the rotary switch member of the rear wiper/washer switch comprises a peripheral stop which interacts with a spring-biased stop sleeve associated with the support. These stops are arranged in a space-saving manner and symmetrically to the longitudinal axis of the steering column switch.

DETAILED DESCRIPTION OF THE INVENTION

Figure 1:
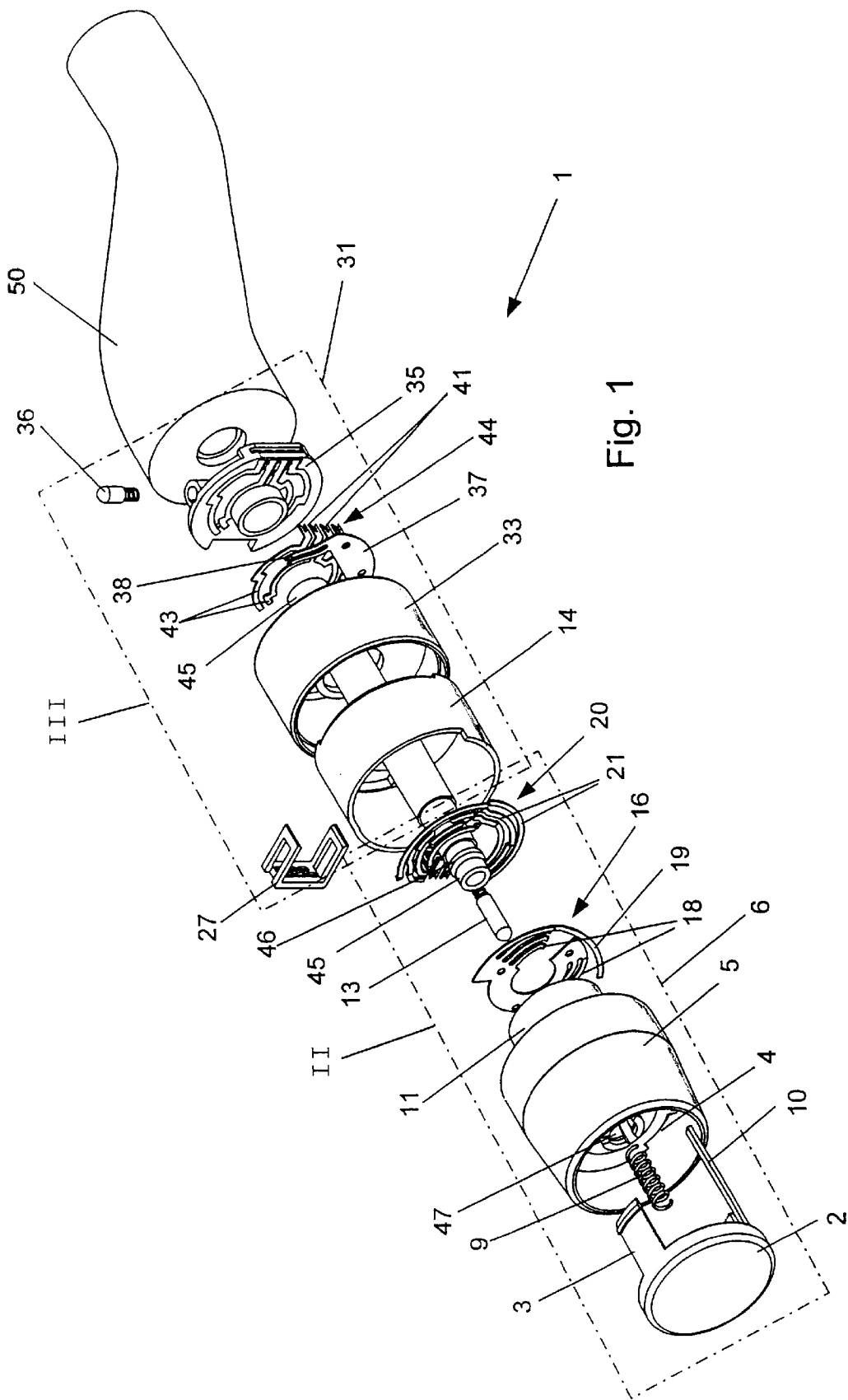
FIG. 1 is an exploded view of a steering column switch of the invention herein.
Figure 2:
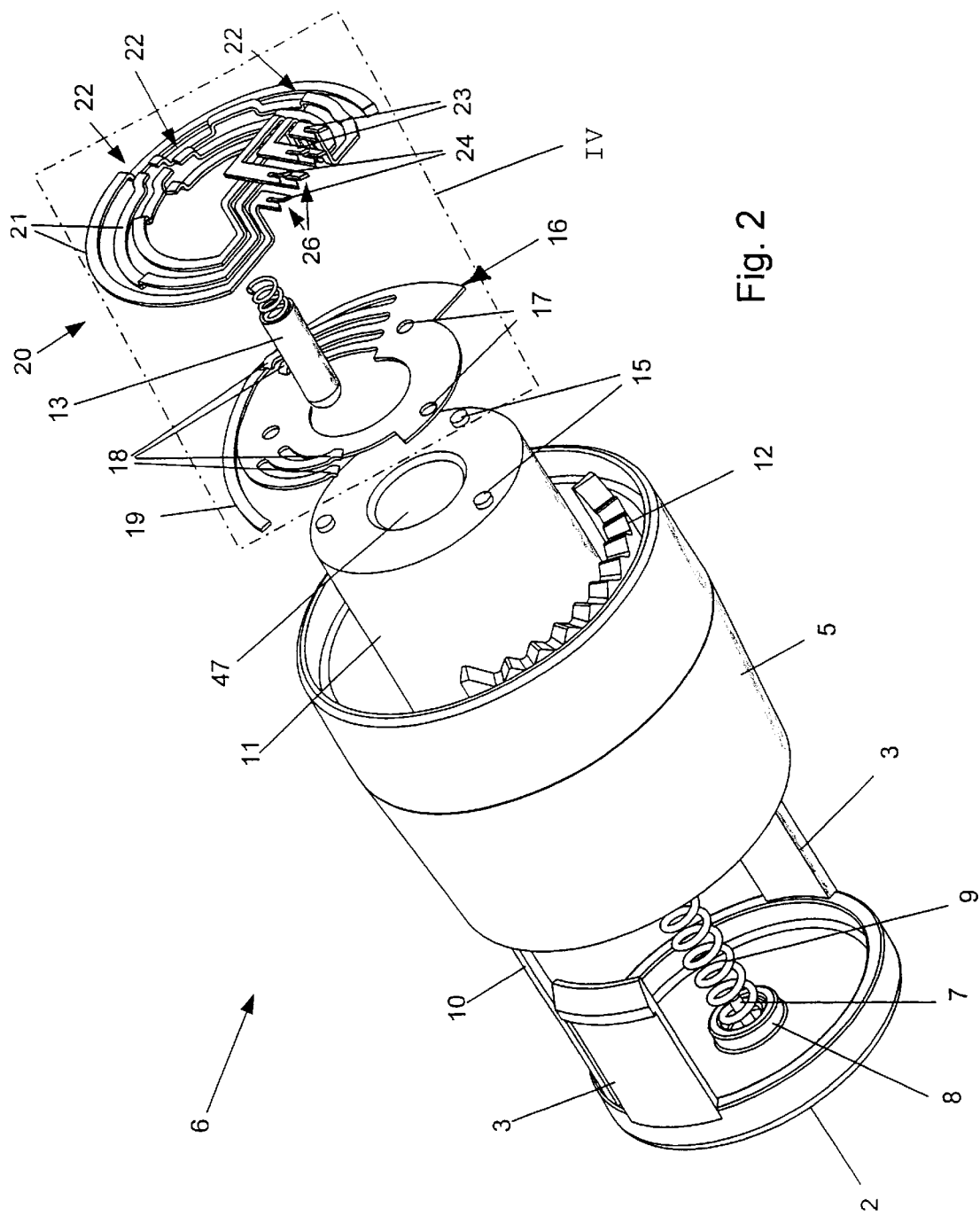
FIG. 2 is a rotated illustration of Detail II in accordance with FIG. 1.
Figure 3:
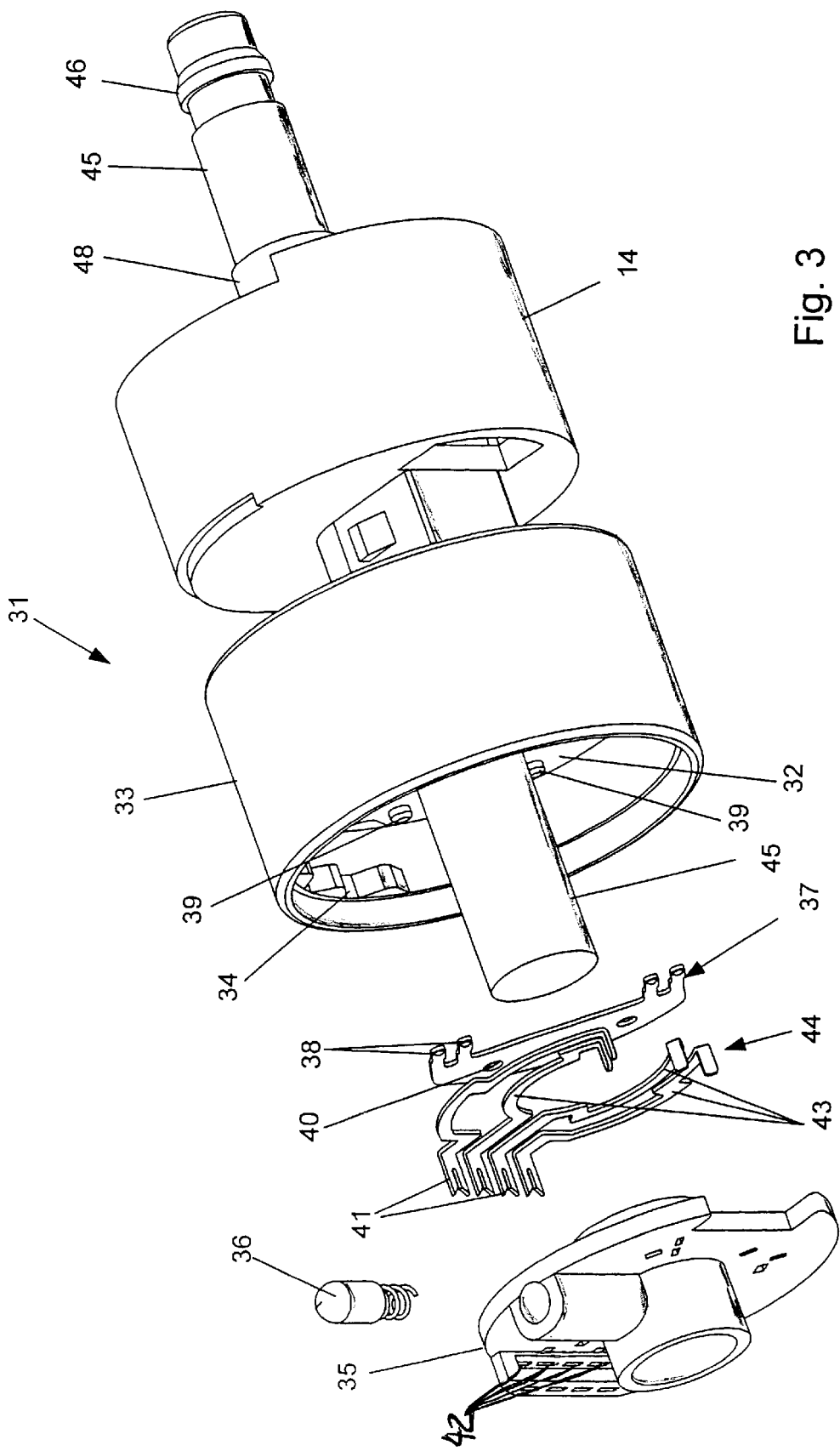
FIG. 3 is a rotated illustration of Detail III in accordance with FIG. 1.
Figure 4:
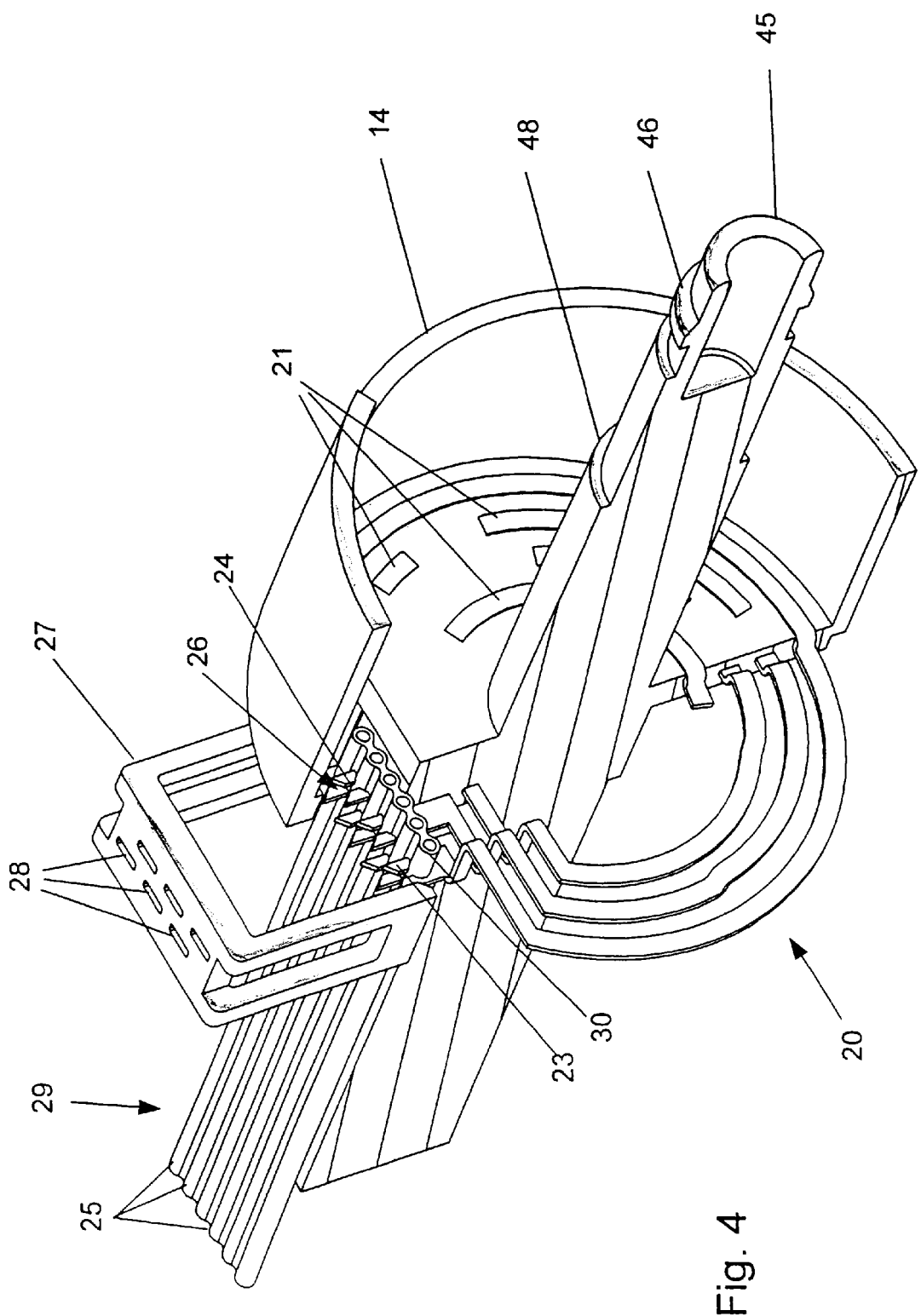
FIG. 4 is an illustration of Detail IV, partially assembled, in accordance with FIG. 2.

Referring to FIGS. 1–3, a pushbutton 2 for a front washing function is set in the end of a switch lever indicated generally at 1 of the steering column switch, whereby said pushbutton is movably arranged by means of opposing clip arms 3 in corresponding recesses 4 of a rotary handle 5 of a front wiper/washer switch assembly 6. On the side associated with rotary handle 5, pushbutton 2 has a centrally located pin 7 and an annular bead or guide 8 for fixing a compression spring 9 in position. One end of spring 9 abuts against pushbutton 2; and, its other end registers against rotary handle 5. Compression spring 9 ensures the resetting motion of pushbutton 2 after it has been activated. Furthermore, an actuation pushrod 10 is located on the external periphery of pushbutton 2, and extends through a rotary switch member 11 of front wiper/washer switch assembly 6.

Front wiper/washer switch assembly 6 essentially comprises rotary handle 5 supporting a cup-shaped rotary switch member 11. On the end between rotary handle 5 and rotary switch member 11 is a stop 12 configured as a segment of a circle, the stop 12 interacting with a spring-biased stop sleeve 13, whereby said stop sleeve 13 is associated with a spacer ring 14 of switch lever 1. The interaction between stop 12 and stop sleeve 13 locks front wiper/washer switch assembly 6 securely in the desired switch position. On its end side facing spacer ring 14, rotary switch element 11 has peripherally spaced, preferably equidistant pins 15 for fixing a contact bridge indicated generally at 16 associated with rotary switch member 11 in position for the front wiper/washer functions.

Contact bridge 16, which is configured as a stamped grid, has an opening 17 for the accommodation of pins 15 of rotary switch member 11. Resilient contact arms 18 for the front wiping functions and a resilient contact arm 19 for the front washing function are provided having the form of a segment of a circle relative to the periphery of contact bridge 16. The free ends of contact arms 18 point in the direction of spacer ring 14 and the free end of contact arm 19 points in the direction of actuation pushrod 10 of pushbutton 2. The free ends of contact arms 18 are arranged in such a manner that they interact with switch contact paths 21 configured as a stamped grid indicated generally at 20, whereby said contact paths have angled sections 22 interacting in Gray code with the free ends of contact arms 18 in order to transfer the front wiping function data. The front washing function is initiated by exerting pressure on pushbutton 2, whereby actuation pushrod 10 moves contact arm 19 in the direction of the associated switch contact path 21 of stamped grid 20.

Stamped grid 20 is set in spacer ring 14 in order to give it sufficient strength. The areas of switch contact paths 21, which are acted upon by contact arms 18, 19 of the corresponding contact bridge, extend toward the outside. In order to connect stamped grid 20 with an on-board electrical systems of a motor vehicle each of switch contact paths 21 is provided with a connection contact 23. Connection contacts 23 have on their free end a groove 24 having a width corresponding to the diameter of one of the connection lines 25 and terminating in a widening V-shaped cutout 26. When a bracket 27 having openings 28 corresponding to connection contacts 23 is attached, connection lines 25 configured as ribbon cables 29 located in the area of their associate connection contacts are pressed into corresponding groove 24, whereby insulation 30 of ribbon cable indicated generally at 29 is notched and contact established.

On the side of spacer ring 14 facing away from stamped grid 20, is a rear wiper/washer switch indicated generally at 31 having a rotary switch member 32 provided in a rotary handle 33 and having a peripheral stop 34. This stop 34 cooperates with a peripheral spring-biased stop cup or sleeve 36 inserted peripherally in a support 35 in order to lock rear wiper/washer switch 31 in position. On its end side facing support 35, rotary switch member 32 is associated in a non-rotational manner with a contact bridge indicated generally at 37, which is configured as a stamped grid and has contact arms 38. Contact bridge 37 is mounted by means of pins or lugs 39 molded to rotary switch member 32, the pins 39 coming into engagement with corresponding bores or apertures 40 of contact bridge 37. For connection with the on-board electrical system, contact bridge 37 is provided with connection contacts 41 extrusion-molded like connection contacts 23 and creating a clamp-and-notch type connection with openings 42 of support 35.

For the transfer of the rear wiper/washer function data, contact bridge 37 interacts with switch contact paths 43 of a stamped grid 44 mounted to support 37, whereby, in turn, the transfer of the rear wiper/washer function data is effected by Gray code.

In order to assemble the individual components of switch lever 1, spacer ring 14 comprises a graduated shaft 45 which extends beyond both of the end sides of spacer ring 14. The side of shaft 45 facing front wiper/washer switch assembly 6 is provided with an annular projection 46 which reaches around a corresponding axial cutout 47 of rotary handle 5, thereby holding front wiper/washer switch assembly 6 in a manner that it can be rotated. An enlarged-diameter section 48 of shaft 45 is guided in a bore 49 in the end side of rotary switch member 11. The part of shaft 45 opposite enlarged-diameter section 48 centers rear wiper/washer switch 31, as well as the non-rotationally arranged support 35 and is fixed in position in a base 50 of switch lever 1.

Although the invention has hereinabove been described with respect to the illustrated embodiments, it will be understood that the invention is capable of modification and variation and is limited only by the following claims.

What is claimed is:

1. A motor vehicle steering column switch comprising at least one wiper and washer switch disposed as an integral part of a switch lever, wherein said at least one wiper and washer switch includes a front wiper and washer switch and a rear wiper and washer switch, said at least one wiper and washer switch having a contact bridge held in position on a rotary switch member the contact bridge having plural contact arms disposed thereon to act on switch contact paths with associated connection contacts disposed on the lever, wherein the switch contact paths of the front and the rear wiper and washer switches, respectively, are configured as stamped grids, and wherein the contact bridges of the front and the rear wiper and washer switches, respectively, are configured as a stamped grid with resilient contact arms, and wherein the contact bridge and the switch contact paths interact to transfer switch function data in Grey code.

2. The steering column switch in accordance with claim 1, characterized in that the contact arms of the contact bridge associated with the front wiper and washer switch point in a direction opposite the contact arms associated with the front wiping functions.

3. The steering column switch in accordance with claim 1, characterized in that the switch contact paths are provided with clamp connections in order to provide contact with connection lines.

4. The steering column switch in accordance with claim 1, characterized in that the switch contact paths of the front wiper and washer switch are set in a non-rotational manner into a spacer ring located between two rotary handles of the front and the rear wiper and washer switches.

5. The steering column switch in accordance with claim 4, characterized in that, molded to the spacer ring, is a concentric shaft holding the front and the rear wiper and washer switches, whereby said shaft is fixed in position in the rotary handle of the front wiper and washer switch on one side and in a base of the switch lever on the other side.

6. The steering column switch in accordance with claim 4, characterized in that the switch contact paths of the rear wiper and washer switch are mounted to a support located between the base of the switch lever and the rotary handle of the rear wiper and washer switch.

7. The steering column switch in accordance with claim 6, characterized in that the support is arranged in a non-rotational manner on the shaft of the spacer ring.

8. The steering column switch in accordance with claim 1, characterized in that, by means of a pushbutton set into the end of the switch lever, a pushrod acts on the contact arm of the contact bridge of the rotary switch member of the front wiper and washer switch in order to actuate the front washing function.

9. The steering column switch in accordance with claim 1, characterized in that the rotary switch member of the front wiper and washer switch has on its end a stop, which interacts with a spring-biased stop sleeve associated with the spacer ring.

10. The steering column switch in accordance with claim 1, characterized in that the rotary switch member of the rear wiper and washer switch has a peripheral stop, which interacts with a spring-biased stop sleeve associated with the lever.

* * * * *